Oct. 9, 1928.  1,686,906
L. FABA
SAFETY LOCK FOR GAS STOVE VALVES
Filed Sept. 7, 1926
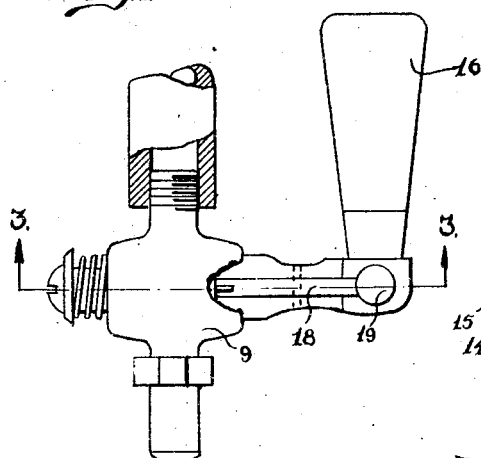
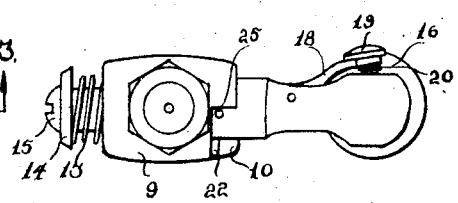
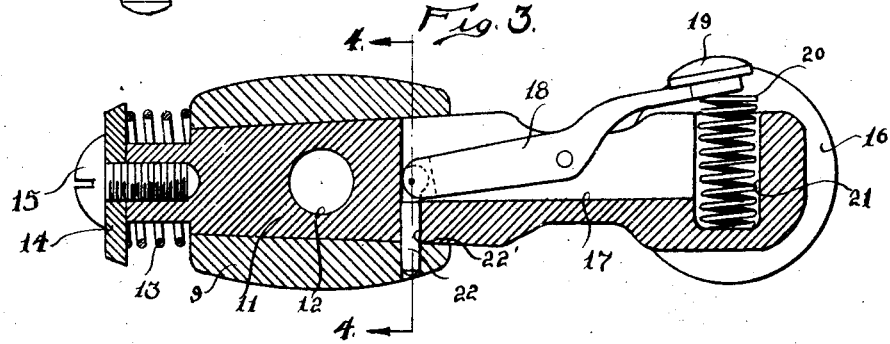
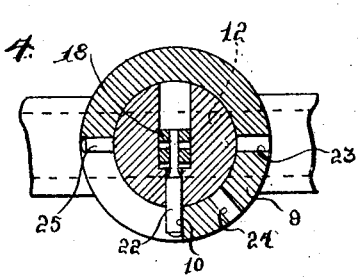
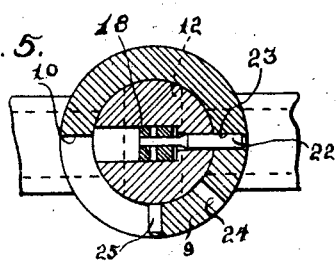
INVENTOR.
Luigi Faba.
BY Thos. L. Donnelly
ATTORNEY.

Patented Oct. 9, 1928.

1,686,906

UNITED STATES PATENT OFFICE.

LUIGI FABA, OF DETROIT, MICHIGAN.

SAFETY LOCK FOR GAS-STOVE VALVES.

Application filed September 7, 1926. Serial No. 133,965.

My invention relates to a new and useful improvement in a safety lock for gas stove valves, and has for its object the provision of a lock which may be mounted on a gas stove valve, and adapted for locking the valve in either open, closed or partially open position, so that a child will be prevented from manipulating the valve for controlling the flow of gas to the stove.

Another object of the invention is the provision of a safety device of this class which will be simple in structure, economical of manufacture, and highly efficient in use.

Another object of the invention is the provision in a device of this class of a locking puncher adapted for being retracted by a rocking spring held arm.

Other objects will appear hereinafter.

The invention consists in the combination and arrangement of parts hereinafter described and claimed.

The invention will be best understood by reference to the accompanying drawings which form a part of this invention and in which, Fig. 1 is a side elevational view of the invention.

Fig. 2 is a rear elevational view of the invention.

Fig. 3 is a sectional view taken of substantially line 3—3 of Fig. 1.

Fig. 4 is a fragmentary sectional view taken of substantially line 4—4 of Fig. 3, showing the valve in closed position, and, Fig. 5 is a sectional view similar to Fig. 4 showing the valve in open position.

As shown in the drawings, the invention is adapted for mounting on a valve used for controlling the flow of gas to gas stove, and the like, and I have shown the invention applied to the usual structure of stop cock used in this connection. The casing 9 has its upper edge cut away as at (10), and there is mounted in the casing 9 the tapered plug 11, having a vent opening 12 projecting therethrough, and embraced at one end by a spring 13 which engages a washer 14 held in position by the screw 15, so that the plug is normally held in snug relation to the casing 9. The plug 11 is provided with the usual operating handle 16.

The plug 11 is cut away as at 17 to provide a recess in which may be engaged an arm 19 which is pivotally mounted and the recess 17 intermediate its end, and provided at one end with a head 19. Engaging one end of the arm 18 is one end of a coil spring 19 which is positioned in a recess 21 formed in the outwardly projecting portion of the plug 11. Pivotally mounted to the other end of the arm 18 is a pin 22 which is adapted in response to the pressure of the spring 20 to project through an opening 23' which is formed in the plug 11. Formed in the casing 9 are spaced radially extending openings 23 and 24, the opening 23 being so positioned that when the pin 22 is engaged therein the plug 11 will be so turned that the valve will be fully open. The opening 24 is so positioned that when the pin 22 engages therein the plug 11 will be so turned that the valve will be partially opened. Projecting diametrically outwardly from the plug 11 is a pin 25, this pin 25 being adapted to engage one end of the cut away portion 10 when the pin 22 is in engagement with the opening 23. When the plug 11 is so turned that the pin 22 engages in the cut away portion 10, as shown in Fig. 4, the pin 25 will engage the opposite end of the cut away portion 10. In this position the valve is fully closed, and in order to open the valve it is necessary that the arm 18 be rocked on its pivot against the tension of the spring 20. Similarly in order to move the valve from a position in which the pin 22 is in engagement with either the opening 23 or 24, it will be necessary to rock the arm 18 on its pivot so as to retract the pin 22.

It is thus seen that I have provided a safety device which is simple in structure and which may be easily and quickly operated by a person knowing that the rocking of the arm 18 is necessary for a movement of the plug 11 from one position to another. The structure, however, is believed complicated enough to baffle a child who would not be possessed of sense enough to refrain from tampering or toying with the valve.

While I have illustrated and described the preferred form of structure I do not wish to limit myself to the precise details of structure shown, but desire to avail myself of such variations and modifications as come within the scope of the appended claims.

Having thus described my invention what I claim as new and desire to secure by Letters Patent is:

1. A stop cock of the class described comprising: a shell having a plurality of radially extending openings formed therein adjacent one end thereof and provided with a recess in said end, the base of said recess lying in the same plane as the base of said openings; a plug rotatably mounted in said shell, said plug having a radially extending opening formed therein, said opening being adapted for registering with the openings formed in said shell upon rotation of said plug to predetermined positions, said plug having a longitudinally extending recess formed adjacent one end communicating at its outer end with a transversely extending pocket; a coil spring positioned in said pocket; a rocker arm pivotally mounted in said longitudinally extending recess and engaging at one end the outer end of said spring; a locking pin pivotally connected to the other end of said rocker arm and engaging in the opening formed in said plug, and adapted for projecting into the openings formed in said shell upon registering of the opening formed in said plug with said openings in said shell.

2. A stop cock of the class described, comprising: a shell having a plurality of radially extending openings formed therein adjacent one end thereof and provided with a recess in said end, the base of said recess lying in the same plane as the base of said openings; a plug rotatably mounted in said shell, said plug having a radially extending opening formed therein, said opening being adapted for registering with the openings formed in said shell upon rotation of said plug to predetermined positions, said plug having a longitudinally extending recess formed adjacent one end communicating at its outer end with a transversely extending pocket; a coil spring positioned in said pocket; a rocker arm pivotally mounted intermediate its ends in said longitudinally extending recess and outwardly offset toward one end, said outwardly offset end engaging the outer end of said spring; a locking pin pivotally connected to the other end of said rocker arm and engaging in the opening formed in said plug, and adapted for projecting into the openings formed in said shell upon registering of the opening formed in said plug with said openings in said shell.

In testimony whereof I have signed the foregoing.

LUIGI FABA.